(12) United States Patent
Eisenfeld et al.

(10) Patent No.: US 12,487,457 B2
(45) Date of Patent: Dec. 2, 2025

(54) VIRTUAL IMAGE DELIVERY SYSTEM FOR NEAR EYE DISPLAYS

(71) Applicant: LUMUS LTD., Ness Ziona (IL)

(72) Inventors: Tsion Eisenfeld, Ashkelon (IL); Shimon Grabarnik, Rehovot (IL)

(73) Assignee: LUMUS LTD., Ness Ziona (IL)

( * ) Notice: Subject to any disclaimer, the term of this patent is extended or adjusted under 35 U.S.C. 154(b) by 695 days.

(21) Appl. No.: 17/792,974

(22) PCT Filed: Jun. 1, 2021

(86) PCT No.: PCT/IL2021/050651
§ 371 (c)(1),
(2) Date: Jul. 14, 2022

(87) PCT Pub. No.: WO2021/245664
PCT Pub. Date: Dec. 9, 2021

(65) Prior Publication Data
US 2023/0051619 A1    Feb. 16, 2023

Related U.S. Application Data

(60) Provisional application No. 63/032,767, filed on Jun. 1, 2020.

(51) Int. Cl.
*G02B 27/01* (2006.01)
*G02B 6/26* (2006.01)
(Continued)

(52) U.S. Cl.
CPC .......... *G02B 27/0172* (2013.01); *G02B 6/26* (2013.01); *G02B 27/0977* (2013.01); *G02B 27/145* (2013.01)

(58) Field of Classification Search
CPC .. G02B 27/0172; G02B 6/26; G02B 27/0977; G02B 2027/0125; G02B 6/00;
(Continued)

(56) References Cited

U.S. PATENT DOCUMENTS 2,748,659 A    6/1956   Walter et al.
2,795,069 A    6/1957   George
(Continued)

FOREIGN PATENT DOCUMENTS

CN    109239835 A    1/2019
CN    109613644 A    4/2019
(Continued)

OTHER PUBLICATIONS

Mukawa et al, "A full-color eyewear display using planar waveguides with reflection volume holograms", Mar. 2009, Information Display 25(3):27-27, DOI:10.1002/j.2637-496X.2009.tb00066.x, 10 pages.

(Continued)

*Primary Examiner* — Cara E Rakowski
*Assistant Examiner* — Ruby L Kauffman
(74) *Attorney, Agent, or Firm* — Scully, Scott, Murphy & Presser

(57) ABSTRACT

An image delivery system (IDS) comprising: a first waveguide comprising an input aperture for receiving an input virtual image provided by a display engine and a first plurality of first facets positioned to reflect light from the received input virtual image out from the first waveguide; a second waveguide configured to receive the light reflected out from the first waveguide and comprising a second plurality of second facets positioned to reflect the received light out from the second waveguide to project an output virtual image responsive to the input into an eye motion box (EMB); and a partially reflective coating formed on each facet selected from a number of different partially reflective coatings less than a total number of facets equal to a sum of the number of facets in the first and second pluralities; wherein the output virtual image exhibits a fidelity of 80% or better.

15 Claims, 5 Drawing Sheets

(51) Int. Cl.
*G02B 27/09* (2006.01)
*G02B 27/14* (2006.01)

(58) Field of Classification Search
CPC .......... G02B 27/145; G02B 2027/0194; G02B 27/01; G02B 2027/01
See application file for complete search history.

(56) References Cited

U.S. PATENT DOCUMENTS

| | | | |
|---|---|---|---|
| 2,886,911 A | 5/1959 | George | |
| 3,491,245 A | 1/1970 | Hardesty | |
| 3,626,394 A | 12/1971 | Nelson et al. | |
| 3,667,621 A | 6/1972 | Barlow | |
| 3,677,621 A | 7/1972 | Smith | |
| 3,737,212 A | 6/1973 | Antonson et al. | |
| 3,802,763 A | 4/1974 | Cook et al. | |
| 3,857,109 A | 12/1974 | Pilloff | |
| 3,873,209 A | 3/1975 | Schinke et al. | |
| 3,940,204 A | 2/1976 | Withrington | |
| 4,084,883 A | 4/1978 | Eastman et al. | |
| 4,191,446 A | 3/1980 | Arditty et al. | |
| 4,309,070 A | 1/1982 | St. Leger Searle | |
| 4,331,387 A | 5/1982 | Wentz | |
| 4,516,828 A | 5/1985 | Steele | |
| 4,613,216 A | 9/1986 | Herbec et al. | |
| 4,711,512 A | 12/1987 | Upatnieks | |
| 4,715,684 A | 12/1987 | Gagnon | |
| 4,720,189 A | 1/1988 | Heynen et al. | |
| 4,775,217 A | 10/1988 | Ellis | |
| 4,798,448 A | 1/1989 | Van Raalte | |
| 4,805,988 A | 2/1989 | Dones | |
| 4,932,743 A | 6/1990 | Isobe et al. | |
| 4,978,952 A | 12/1990 | Irwin | |
| 5,033,828 A | 7/1991 | Haruta | |
| 5,076,664 A | 12/1991 | Migozzi | |
| 5,096,520 A | 3/1992 | Faris | |
| 5,157,526 A | 10/1992 | Kondo et al. | |
| 5,208,800 A | 5/1993 | Isobe et al. | |
| 5,231,642 A | 7/1993 | Scifres et al. | |
| 5,235,589 A | 8/1993 | Yokomori et al. | |
| 5,301,067 A | 4/1994 | Bleier et al. | |
| 5,353,134 A | 10/1994 | Michel et al. | |
| 5,367,399 A | 11/1994 | Kramer | |
| 5,369,415 A | 11/1994 | Richard et al. | |
| 5,430,505 A | 7/1995 | Katz | |
| 5,453,877 A | 9/1995 | Gerbe et al. | |
| 5,543,877 A | 8/1996 | Takashi et al. | |
| 5,555,329 A | 9/1996 | Kuper et al. | |
| 5,619,601 A | 4/1997 | Akashi et al. | |
| 5,650,873 A | 7/1997 | Gal et al. | |
| 5,680,209 A | 10/1997 | Machler | |
| 5,724,163 A | 3/1998 | David | |
| 5,751,480 A | 5/1998 | Kitagishi | |
| 5,764,412 A | 6/1998 | Suzuki et al. | |
| 5,829,854 A | 11/1998 | Jones | |
| 5,883,684 A | 3/1999 | Millikan et al. | |
| 5,896,232 A | 4/1999 | Budd et al. | |
| 5,919,601 A | 7/1999 | Nguyen et al. | |
| 5,966,223 A | 10/1999 | Friesem et al. | |
| 5,982,536 A | 11/1999 | Swan et al. | |
| 5,999,836 A | 12/1999 | Nelson et al. | |
| 6,021,239 A | 2/2000 | Minami et al. | |
| 6,052,500 A | 4/2000 | Takano et al. | |
| 6,091,548 A | 7/2000 | Chen | |
| 6,144,347 A | 11/2000 | Mizoguchi et al. | |
| 6,154,321 A | 11/2000 | Melville et al. | |
| 6,231,992 B1 | 5/2001 | Niebauer et al. | |
| 6,264,328 B1 | 7/2001 | Williams et al. | |
| 6,356,392 B1 | 3/2002 | Spitzer | |
| 6,490,104 B1 | 12/2002 | Gleckman et al. | |
| 6,626,906 B1 | 9/2003 | Young | |
| 6,671,100 B1 | 12/2003 | McRuer | |
| 6,762,801 B2 | 7/2004 | Weiss et al. | |
| 6,799,859 B1 | 10/2004 | Ida et al. | |
| 6,829,095 B2 | 12/2004 | Amitai | |
| 6,927,694 B1 | 8/2005 | Smith et al. | |
| 7,391,573 B2 | 6/2008 | Amitai | |
| 7,457,040 B2 | 11/2008 | Amitai | |
| 7,589,901 B2 | 9/2009 | DeJong et al. | |
| 7,724,443 B2 | 5/2010 | Amitai | |
| 7,751,122 B2 | 7/2010 | Amitai | |
| 7,839,575 B2 | 11/2010 | DeJong et al. | |
| 7,949,252 B1 | 5/2011 | Georgiev | |
| 8,140,197 B2 | 3/2012 | Lapidot et al. | |
| 8,187,481 B1 | 5/2012 | Hobbs | |
| 8,405,573 B2 | 3/2013 | Lapidot et al. | |
| 8,432,614 B2 | 4/2013 | Amitai | |
| 8,472,119 B1 | 6/2013 | Kelly | |
| 8,655,178 B2 | 2/2014 | Capron et al. | |
| 8,736,963 B2 | 5/2014 | Robbins et al. | |
| 8,743,464 B1 | 6/2014 | Amirparviz | |
| 8,870,384 B2 | 10/2014 | Imai et al. | |
| 9,025,253 B2 | 5/2015 | Hadad et al. | |
| 9,039,906 B2 | 5/2015 | Schulz et al. | |
| 9,285,591 B1 | 3/2016 | Gupta et al. | |
| 9,741,175 B2 | 8/2017 | Mukawa | |
| 9,798,061 B2 | 10/2017 | Hsiao et al. | |
| 9,805,633 B2 | 10/2017 | Zheng et al. | |
| 10,078,222 B2 | 9/2018 | Komatsu et al. | |
| 10,133,070 B2 | 11/2018 | Danziger | |
| 10,222,535 B2 | 3/2019 | Remhof et al. | |
| 10,359,632 B2 | 7/2019 | Schultz | |
| 10,437,068 B2 | 10/2019 | Weng et al. | |
| 10,509,241 B1 | 12/2019 | Robbins et al. | |
| 10,551,544 B2 * | 2/2020 | Danziger | G02B 27/0056 |
| 10,732,461 B2 | 8/2020 | Yoshida | |
| 11,099,737 B2 | 8/2021 | Abe et al. | |
| 11,256,100 B2 | 2/2022 | Schultz et al. | |
| 2002/0015233 A1 | 2/2002 | Park | |
| 2002/0191297 A1 | 12/2002 | Gleckman et al. | |
| 2003/0007157 A1 | 1/2003 | Hulse et al. | |
| 2003/0020006 A1 | 1/2003 | Janeczko et al. | |
| 2003/0063042 A1 | 4/2003 | Friesem et al. | |
| 2003/0090439 A1 | 5/2003 | Spitzer et al. | |
| 2003/0165017 A1 | 9/2003 | Amitai | |
| 2003/0197938 A1 | 10/2003 | Schmidt et al. | |
| 2003/0218718 A1 | 11/2003 | Moliton et al. | |
| 2004/0032660 A1 | 2/2004 | Amitai | |
| 2004/0033528 A1 | 2/2004 | Amitai | |
| 2004/0085649 A1 | 5/2004 | Repetto et al. | |
| 2004/0137189 A1 | 7/2004 | Tellini et al. | |
| 2005/0018308 A1 | 1/2005 | Cassarly et al. | |
| 2005/0073577 A1 | 4/2005 | Sudo et al. | |
| 2005/0078388 A1 | 4/2005 | Amitai | |
| 2005/0083592 A1 | 4/2005 | Amitai et al. | |
| 2005/0084210 A1 | 4/2005 | Cha | |
| 2005/0174641 A1 | 8/2005 | Greenberg et al. | |
| 2005/0174658 A1 | 8/2005 | Long et al. | |
| 2005/0180687 A1 | 8/2005 | Amitai | |
| 2005/0225866 A1 | 10/2005 | Abu-Ageel | |
| 2005/0265044 A1 | 12/2005 | Chen et al. | |
| 2006/0126182 A1 | 6/2006 | Levola | |
| 2006/0146518 A1 | 7/2006 | Dubin et al. | |
| 2006/0153518 A1 | 7/2006 | Abu-Ageel | |
| 2006/0221448 A1 | 10/2006 | Nivon et al. | |
| 2006/0268421 A1 | 11/2006 | Shimizu et al. | |
| 2006/0291021 A1 | 12/2006 | Mukawa | |
| 2007/0002191 A1 | 1/2007 | Hashizume et al. | |
| 2007/0070859 A1 | 3/2007 | Hirayama | |
| 2007/0091445 A1 | 4/2007 | Amitai | |
| 2007/0097513 A1 | 5/2007 | Amitai | |
| 2007/0155277 A1 | 7/2007 | Amitai et al. | |
| 2007/0165192 A1 | 7/2007 | Prior et al. | |
| 2007/0273611 A1 | 11/2007 | Torch | |
| 2008/0025667 A1 | 1/2008 | Amitai | |
| 2008/0094586 A1 | 4/2008 | Hirayama | |
| 2008/0106775 A1 | 5/2008 | Amitai et al. | |
| 2008/0151379 A1 | 6/2008 | Amitai | |
| 2008/0186604 A1 | 8/2008 | Amitai | |
| 2008/0198471 A1 * | 8/2008 | Amitai | G02B 27/285 359/630 |
| 2008/0278812 A1 | 11/2008 | Amitai | |
| 2008/0285140 A1 | 11/2008 | Amitai | |
| 2009/0052046 A1 | 2/2009 | Amitai | |

(56) References Cited

U.S. PATENT DOCUMENTS

| | | |
|---|---|---|
| 2009/0052047 A1 | 2/2009 | Amitai |
| 2009/0097127 A1 | 4/2009 | Amitai |
| 2009/0122414 A1 | 5/2009 | Amitai |
| 2009/0153437 A1 | 6/2009 | Aharoni |
| 2009/0190222 A1 | 7/2009 | Simmonds et al. |
| 2009/0279180 A1 | 11/2009 | Amitai et al. |
| 2010/0021465 A1 | 1/2010 | Lobanenkov et al. |
| 2010/0067110 A1 | 3/2010 | Hadad et al. |
| 2010/0111472 A1 | 5/2010 | DeJong |
| 2010/0171680 A1 | 7/2010 | Lapidot et al. |
| 2010/0202128 A1 | 8/2010 | Saccomanno |
| 2010/0278480 A1 | 11/2010 | Vasylyev |
| 2010/0291489 A1 | 11/2010 | Moskovits et al. |
| 2011/0109880 A1 | 5/2011 | Nummela |
| 2011/0242661 A1 | 10/2011 | Simmonds |
| 2012/0039576 A1 | 2/2012 | Dangel et al. |
| 2012/0062998 A1 | 3/2012 | Schultz et al. |
| 2012/0120498 A1 | 5/2012 | Harrison et al. |
| 2012/0147361 A1 | 6/2012 | Mochizuki et al. |
| 2012/0179369 A1 | 7/2012 | Lapidot et al. |
| 2012/0206817 A1 | 8/2012 | Totani et al. |
| 2012/0306940 A1 | 12/2012 | Machida et al. |
| 2013/0007704 A1 | 1/2013 | Haynes et al. |
| 2013/0007833 A1 | 1/2013 | Kitazato et al. |
| 2013/0070344 A1 | 3/2013 | Takeda et al. |
| 2013/0208362 A1 | 8/2013 | Bohn et al. |
| 2013/0229717 A1 | 9/2013 | Amitai |
| 2013/0242392 A1 | 9/2013 | Amirparviz et al. |
| 2013/0276960 A1 | 10/2013 | Amitai |
| 2013/0279017 A1 | 10/2013 | Amitai |
| 2013/0321432 A1 | 12/2013 | Burns |
| 2013/0334504 A1 | 12/2013 | Thompson et al. |
| 2014/0003762 A1 | 1/2014 | Macnamara |
| 2014/0014065 A1 | 1/2014 | Hayashi et al. |
| 2014/0016051 A1 | 1/2014 | Kroll et al. |
| 2014/0019801 A1 | 1/2014 | Sutton et al. |
| 2014/0043688 A1 | 2/2014 | Schrader |
| 2014/0104665 A1 | 4/2014 | Popovich et al. |
| 2014/0118813 A1 | 5/2014 | Amitai et al. |
| 2014/0118836 A1 | 5/2014 | Amitai et al. |
| 2014/0118837 A1 | 5/2014 | Amitai et al. |
| 2014/0126051 A1* | 5/2014 | Amitai ............... G02B 27/0172 359/465 |
| 2014/0126052 A1 | 5/2014 | Amitai et al. |
| 2014/0126056 A1 | 5/2014 | Amitai et al. |
| 2014/0126057 A1 | 5/2014 | Amitai et al. |
| 2014/0126175 A1 | 5/2014 | Amitai et al. |
| 2014/0160577 A1 | 6/2014 | Dominici et al. |
| 2014/0185142 A1 | 7/2014 | Gupta et al. |
| 2014/0226215 A1 | 8/2014 | Komatsu et al. |
| 2014/0374377 A1 | 12/2014 | Schulz et al. |
| 2015/0016777 A1 | 1/2015 | Abovitz et al. |
| 2015/0081313 A1 | 3/2015 | Boross et al. |
| 2015/0138451 A1 | 5/2015 | Amitai |
| 2015/0138646 A1 | 5/2015 | Tatsugi |
| 2015/0160529 A1 | 6/2015 | Popovich et al. |
| 2015/0198805 A1 | 7/2015 | Mansharof et al. |
| 2015/0205140 A1 | 7/2015 | Mansharof et al. |
| 2015/0205141 A1 | 7/2015 | Mansharof et al. |
| 2015/0207990 A1 | 7/2015 | Ford et al. |
| 2015/0219834 A1 | 8/2015 | Nichol et al. |
| 2015/0243091 A1 | 8/2015 | Schowengerdt |
| 2015/0277127 A1 | 10/2015 | Amitai |
| 2015/0289762 A1 | 10/2015 | Popovich et al. |
| 2015/0293360 A1 | 10/2015 | Amitai |
| 2015/0338655 A1 | 11/2015 | Sawada et al. |
| 2016/0020965 A1 | 1/2016 | Sakata et al. |
| 2016/0116739 A1 | 4/2016 | TeKolste et al. |
| 2016/0116743 A1 | 4/2016 | Amitai |
| 2016/0170212 A1 | 6/2016 | Amitai |
| 2016/0170213 A1 | 6/2016 | Amitai |
| 2016/0170214 A1 | 6/2016 | Amitai |
| 2016/0187656 A1 | 6/2016 | Amitai |
| 2016/0207457 A1 | 7/2016 | Border et al. |
| 2016/0234485 A1 | 8/2016 | Robbins et al. |
| 2016/0314564 A1 | 10/2016 | Jones et al. |
| 2016/0341964 A1 | 11/2016 | Amitai |
| 2016/0349518 A1 | 12/2016 | Amitai et al. |
| 2017/0003504 A1 | 1/2017 | Vallius et al. |
| 2017/0045744 A1 | 2/2017 | Amitai |
| 2017/0052376 A1 | 2/2017 | Amitai |
| 2017/0052377 A1 | 2/2017 | Amitai |
| 2017/0122725 A1 | 5/2017 | Yeoh et al. |
| 2017/0242249 A1 | 8/2017 | Wall et al. |
| 2017/0276947 A1 | 9/2017 | Yokoyama |
| 2017/0285346 A1 | 10/2017 | Pan |
| 2017/0293140 A1 | 10/2017 | Cai et al. |
| 2017/0336636 A1 | 11/2017 | Amitai et al. |
| 2017/0343822 A1 | 11/2017 | Border et al. |
| 2017/0353714 A1 | 12/2017 | Poulad et al. |
| 2017/0357095 A1 | 12/2017 | Amitai |
| 2017/0363799 A1 | 12/2017 | Ofir et al. |
| 2017/0371160 A1 | 12/2017 | Schultz |
| 2018/0023177 A1 | 1/2018 | Rachiele et al. |
| 2018/0033562 A1 | 2/2018 | Chung et al. |
| 2018/0039082 A1 | 2/2018 | Amitai |
| 2018/0067315 A1 | 3/2018 | Amitai et al. |
| 2018/0101087 A1 | 4/2018 | Shinohara |
| 2018/0157057 A1 | 6/2018 | Gelberg et al. |
| 2018/0203237 A1 | 7/2018 | Shih et al. |
| 2018/0210202 A1* | 7/2018 | Danziger ............... G02B 5/30 |
| 2018/0267317 A1 | 9/2018 | Amitai |
| 2018/0275384 A1 | 9/2018 | Danziger et al. |
| 2018/0275409 A1 | 9/2018 | Gao et al. |
| 2018/0284447 A1 | 10/2018 | Matsuki et al. |
| 2018/0284448 A1 | 10/2018 | Matsuki et al. |
| 2018/0292592 A1 | 10/2018 | Danziger |
| 2018/0292599 A1 | 10/2018 | Ofir et al. |
| 2018/0373039 A1 | 12/2018 | Amitai |
| 2019/0011710 A1 | 1/2019 | Amitai |
| 2019/0056600 A1 | 2/2019 | Danziger et al. |
| 2019/0064518 A1 | 2/2019 | Danziger |
| 2019/0155035 A1 | 5/2019 | Amitai |
| 2019/0170327 A1 | 6/2019 | Eisenfeld et al. |
| 2019/0208187 A1 | 7/2019 | Danziger |
| 2019/0212487 A1 | 7/2019 | Danziger et al. |
| 2019/0227215 A1 | 7/2019 | Danziger et al. |
| 2019/0227317 A1 | 7/2019 | Trail et al. |
| 2019/0278086 A1 | 9/2019 | Ofir |
| 2019/0285900 A1 | 9/2019 | Amitai |
| 2019/0293856 A1 | 9/2019 | Danziger |
| 2019/0339530 A1 | 11/2019 | Amitai |
| 2019/0346609 A1 | 11/2019 | Eisenfeld |
| 2019/0361240 A1 | 11/2019 | Gelberg |
| 2019/0361241 A1 | 11/2019 | Amitai |
| 2019/0377187 A1 | 12/2019 | Rubin et al. |
| 2019/0391408 A1 | 12/2019 | Mansharof |
| 2020/0011021 A1 | 1/2020 | Zhang |
| 2020/0033572 A1 | 1/2020 | Danziger et al. |
| 2020/0041713 A1 | 2/2020 | Danziger |
| 2020/0089001 A1 | 3/2020 | Amitai et al. |
| 2020/0110211 A1 | 4/2020 | Danziger et al. |
| 2020/0120329 A1 | 4/2020 | Danziger |
| 2020/0133008 A1 | 4/2020 | Amitai |
| 2020/0150330 A1 | 5/2020 | Danziger et al. |
| 2020/0150332 A1 | 5/2020 | Nakamura et al. |
| 2020/0183159 A1 | 6/2020 | Danziger |
| 2020/0183170 A1 | 6/2020 | Amitai et al. |
| 2020/0192089 A1 | 6/2020 | Haddick et al. |
| 2020/0200963 A1 | 6/2020 | Eisenfeld et al. |
| 2020/0209667 A1 | 7/2020 | Sharlin et al. |
| 2020/0241308 A1 | 7/2020 | Danziger et al. |
| 2020/0249481 A1 | 8/2020 | Danziger et al. |
| 2020/0278557 A1 | 9/2020 | Greenstein et al. |
| 2020/0285060 A1 | 9/2020 | Amitai |
| 2020/0292417 A1 | 9/2020 | Lobachinsky et al. |
| 2020/0292744 A1 | 9/2020 | Danziger |
| 2020/0292819 A1 | 9/2020 | Danziger et al. |
| 2020/0310024 A1 | 10/2020 | Danziger et al. |
| 2020/0326545 A1 | 10/2020 | Amitai et al. |
| 2020/0371311 A1 | 11/2020 | Lobachinsky et al. |
| 2021/0003849 A1 | 1/2021 | Amitai et al. |
| 2021/0018755 A1 | 1/2021 | Amitai |
| 2021/0033773 A1 | 2/2021 | Danziger et al. |

(56) References Cited

U.S. PATENT DOCUMENTS

| | | |
|---|---|---|
| 2021/0033862 A1 | 2/2021 | Danziger et al. |
| 2021/0033872 A1 | 2/2021 | Rubin et al. |
| 2021/0055218 A1 | 2/2021 | Aldaag et al. |
| 2021/0055466 A1 | 2/2021 | Eisenfeld |
| 2021/0055561 A1 | 2/2021 | Danziger et al. |
| 2021/0063733 A1 | 3/2021 | Ronen |
| 2021/0072553 A1 | 3/2021 | Danziger et al. |
| 2021/0099691 A1 | 4/2021 | Danziger |
| 2021/0109351 A1 | 4/2021 | Danziger et al. |
| 2021/0116367 A1 | 4/2021 | Gelberg et al. |
| 2021/0141141 A1 | 5/2021 | Danziger et al. |
| 2021/0157150 A1 | 5/2021 | Amitai |
| 2021/0165231 A1 | 6/2021 | Gelberg et al. |
| 2021/0173480 A1 | 6/2021 | Osterhout et al. |
| 2021/0239898 A1 | 8/2021 | Danziger et al. |
| 2021/0271006 A1 | 9/2021 | Ronen et al. |
| 2022/0244546 A1 | 8/2022 | Amitai |

FOREIGN PATENT DOCUMENTS

| | | |
|---|---|---|
| JP | 2003140081 A | 5/2003 |
| WO | 2015192117 A1 | 12/2015 |

OTHER PUBLICATIONS

Zhang et al, "Antireflection effects at nanostructured material interfaces and the suppression of thin-film interference", May 2013, Nanotechnology 24(23):235202, DOI:10.1088/0957-4484/24/23/235202, 8 pages.

"Optimized Moth-eye anti-reflective structures for As_2S_3 chalcogenide optical fibers", 1 page.

Stavroulakis et al, "Suppression of backscattered diffraction from sub-wavelength 'moth-eye' arrays", Jan. 2013, Optics Express 21(1):1-11, DOI:10.1364/OE.21.000001, 12 pages.

De Kraats et al, "Directional and nondirectional spectral reflection from the human fovea", Journal of Biomedical Potics13(2), 024010 (Mar./Apr. 2008), 13 pages.

ICNIRP Guidelines, Published In: Health Physics 74(4):494-522; 1998, 38 pages.

Qiao et al, "A continuous-membrane micro deformable mirror based on anodic bonding of SOI to glass wafer", Microsyst Technol (2010) 16:1765-1769, DOI 10.1007/s00542-010-1102-0, 5 pages.

* cited by examiner

VIRTUAL IMAGE DELIVERY SYSTEM FOR NEAR EYE DISPLAYS

RELATED APPLICATIONS

The present application is a national stage entry of PCT International Application No. PCT/IL2021/050651, filed on Jun. 1, 2021, which claims the benefit under 35 U.S.C. 119 (e) of U.S. Provisional Application No. 63/032,767, filed on Jun. 1, 2020. The disclosure of PCT International Application No. PCT/IL2021/050651 and the disclosure of U.S. Provisional Application No. 63/032,767 are incorporated herein by reference.

FIELD

Embodiments of the disclosure relate to providing near eye display (NED) images.

BACKGROUND

The proliferating headsets, head mounted displays (HMDs) and smart eyeware that are used to provide a user with any of the various new flavors of reality—virtual reality (VR), augmented reality (AR), mixed reality (MR)—deliver computer generated "virtual images", to the eye of a user. For VR, the images are immersive and block out images of the user's real environment. For AR and MR, the images are superposed on "real images" of scenes in the user's real environment that the user sees in his or her field of view (FOV). The virtual images may by way of example provide the user with entertainment and/or informational material related to the real images, a task performed by the user, and/or an explicit or implicit user request.

A display system conventionally referred to as a near eye display (NED) provides the user with the virtual images. The NED comprises a computer controlled display engine such as a liquid crystal on silicon (LCOS), organic light emitting diode (OLED), or laser beam scanning (LBS) microdisplay, that generates the virtual images and an image delivery system that delivers the generated virtual images to the eye of the user for viewing. The image delivery system comprises at least one light guiding optical element (LOE) that receives the virtual images at a relatively small input aperture having a characteristic dimension of less than or equal to about 5 mm and propagates the images to an output aperture near to the eye through which the virtual images are directed into an eye motion box (EMB) for viewing by the user. When the user's eye is positioned in the EMB, the virtual images pass through the user's pupil and onto the user's retina. To fill the EMB so that the user can comfortably see the virtual images without unduly bothering to align the eye with the NED, the NED's at least one LOE is generally configured having a relatively large, expanded output aperture through which the NED transmits the virtual images into the EMB.

A practical NED is generally required to satisfy a complex mix of ergonomic, technical, and financial constraints, and is advantageously configured to have a comfortably large EMB, to be small, lightweight, energy efficient, and to provide clear, relatively high fidelity virtual images that are absent overly obtrusive optical artifacts.

SUMMARY

An aspect of an embodiment of the disclosure relates to providing an image delivery system, also referred to a Good Image Delivery System (GOODIS), for use in a NED that projects a FOV of a virtual image to an EMB which is an advantageously high fidelity copy of a FOV of a virtual image that a display engine provides to the GOODIS. GOODIS receives the virtual image from the display engine at an input aperture and reflects light from the received virtual image from a plurality of partially reflective, optionally dielectric, mirrors, also referred to as facets, to deliver the virtual image to an expanded output aperture from which the virtual image is projected to the EMB for viewing by a user. Polarization of light received from the display engine and/or reflectivity of a dielectric coating for s and/or p polarized light for at least one facet as a function of incident angle, are configured to provide an advantageous degree of fidelity. In an embodiment each facet in a GOODIS that provides an advantageous degree of fidelity is coated with one of a same two different partially reflective optionally dielectric coatings.

Fidelity of the FOV projected into the EMB refers to an extent to which intensity of light that propagates along angular directions in the projected FOV is uniformly proportional to intensity of light that propagates along the same, or parity reversed, respective angular directions in the FOV of the virtual image that the display engine provides to the GOODIS. The FOV projected to the EMB is relatively uniformly proportional to the FOV, also referred to as an input FOV, provided by the display engine if: 1) intensity of light projected along different angular directions in the projected FOV is proportional to intensity of light projected along the same, or parity reversed, respective angular directions in the input FOV by a substantially same constant of proportionality; and 2) the constant of proportionality is relatively independent of location of the projected FOV in the EMB.

In accordance with an embodiment of the disclosure the GOODIS comprises first and second LOEs, an input aperture located on the first LOE through which light from virtual images generated by the display engine is received and an output aperture located on the second LOE through which light from the virtual images is projected to an EMB. Each of the LOEs comprises a waveguide having two parallel, totally internally reflecting (TIR) surfaces and an array of embedded facets that are parallel to each other. The facets, in each waveguide are tilted relative to a propagation direction of the waveguide along which light entering the waveguide propagates in the waveguide. Light entering the input aperture located on the first waveguide propagates along the propagation direction of the first waveguide and is reflected out from the waveguide by the facets in the waveguide to enter the second waveguide. Light entering the second waveguide from the first waveguide propagates along the propagation direction of the second waveguide and is reflected out from the waveguide and projected to the EMB via the output aperture by the facets in the second waveguide. The propagation directions of the first and second waveguides are optionally orthogonal and the first and second waveguides cooperate to expand the input aperture along each of the orthogonal propagation directions.

For convenience of presentation it is assumed that propagation of light along the first waveguide is along an x-axis of a Cartesian coordinate system, light propagating along the second waveguide is assumed to propagate along the y-axis, and the eye box is assumed to be located along the z-axis facing the output aperture of the second waveguide. The first and second waveguides may be referred to respectively as x and y waveguides, their respective embedded facets as x and y facets, and the first and second LOE as x and y LOEs respectively. A virtual image received from the display engine at the input aperture may be referred to as an input virtual image and the image projected by GOODIS to the EMB may be referred to as an output virtual image Light propagating in a waveguide of the GOODIS that is incident on a facet of a waveguide in the GOODIS generally comprises both s and p polarization components. S polarization refers to polarization perpendicular to a plane of incidence of the light and p refers to polarization parallel to the plane of incidence. Each facet reflects light from incident light, directly or indirectly for the case of x and y facets respectively, toward the EMB along a portion of the angular directions in the output FOV projected by GOODIS to the EMB. Let $I(\alpha_m)$ represent intensity of light propagating along an m-th angular direction $\alpha_m$ in the input FOV of a given virtual input image generated by the display engine. Let $P°_k(p,\alpha_m)$ and $P°_k(s,\alpha_m)$ respectively represent intensity of p and s light reflected by the k-th facet in the angular direction $\alpha_m$ of the FOV from light in the given input virtual image that is incident on the facet and let $$TP°_{k,m} \equiv [P°_k(p,\alpha_m)P°_k(s,\alpha_m)] \quad (1)$$

The FOV of the output virtual image projected by GOODIS to the EMB responsive to the given virtual input image may be considered to be a relatively high fidelity copy of the FOV of the input virtual image to a (1-δ)% degree of fidelity if GOODIS satisfies a constraint:

$$[(|TP°_{k,m} - TP°_{j,n}|/AVG(TP°_{k,m}, TP°_{j,n})) < \delta\% | I(\alpha_m) = I(\alpha_n), \forall(j,k), \forall(m,n)] \quad (2)$$

The constraint given by expression (2) requires that for a same intensity of light propagated in the input FOV of the given input virtual image along any two different or same angular directions, the facets reflect substantially a same intensity of light toward the EMB along the same respective angular directions in the output FOV of the output virtual image. The constraint operates to preserve relative brightness of features in the input virtual image to better than δ% in the projected output virtual image projected by GOODIS to the EMB. The constraint also provides for uniformity to better than δ% of intensity of light in an output FOV of the projected output virtual image independent of location of the output FOV in the EMB. In accordance with an embodiment of the disclosure the coatings on the facets in at least one of the x-waveguide and y-waveguide are configured to advantageously satisfy the constraints.

In an embodiment the coatings may be determined responsive to iterative Monte Carlo ray tracing for different configurations of coatings and a cost function that indicates when a given configuration of coatings converges to a configuration that provides GOODIS with a desired fidelity. Among a plurality of degrees of freedom available for modeling and determining coatings for the facets in accordance with an embodiment of the disclosure are at least one or any combination of more than one of reflectivity of an optionally dielectric coating as a function of incident angle for s polarized light and/or p polarized light, a number of facets, spacing between facets and/or their respective tilt angles. A configuration of coatings may be considered to provide a desired fidelity and advantageously satisfy the constraints when the configuration satisfies a criterion responsive to the value of the cost function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the disclosure are described below with reference to figures attached hereto that are listed following this paragraph. Identical features that appear in more than one figure may be labeled with a same label in multiple figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

DETAILED DESCRIPTION

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Wherever a general term in the disclosure is illustrated by reference to an example instance or a list of example instances, the instance or instances referred to, are by way of non-limiting example instances of the general term, and the general term is not intended to be limited to the specific example instance or instances referred to. Unless otherwise indicated, the word "or" in the description and claims is considered to be the inclusive "or" rather than the exclusive or, and indicates at least one of, or any combination of more than one of items it conjoins.

Figure 1:
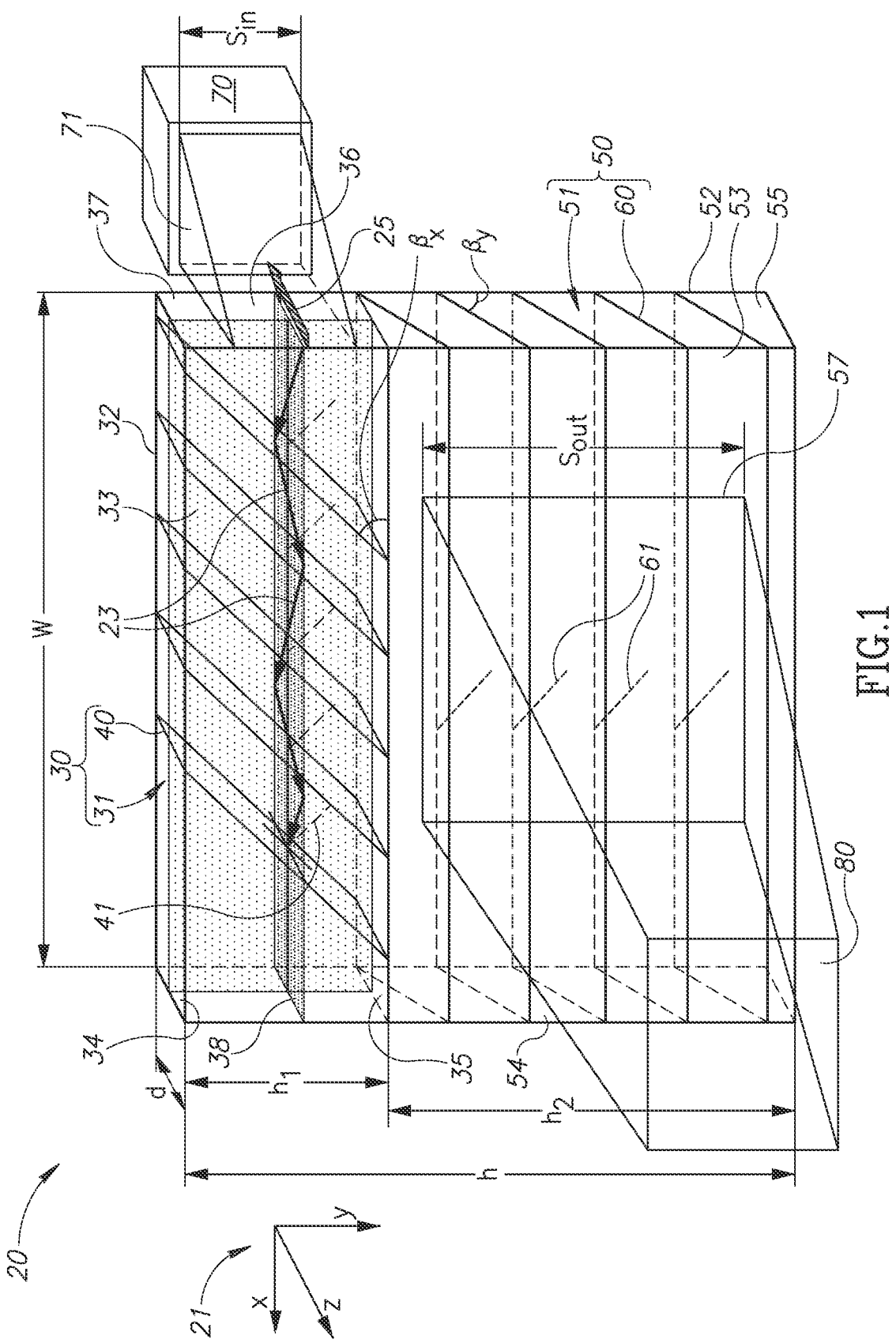
FIG. 1 schematically shows the geometry of a good image delivery system, a GOODIS, comprising first and second LOEs that cooperate to expand in two dimensions an input aperture located in the first LOE to an output aperture located in the second LOE, in accordance with an embodiment of the disclosure.

FIG. 1 schematically shows a GOODIS 20 comprising an x-LOE 30 having a waveguide 31 and facets 40 embedded in the waveguide and a y-LOE 50 having a waveguide 51 and facets 60 embedded in the waveguide in accordance with an embodiment of the disclosure. For convenience of presentation features and geometry of GOODIS 20 are spatially referenced relative to a coordinate system 21.

Waveguide 31, also referred to as x-waveguide 31 is optionally a rectangular prism having relatively large parallel face surfaces 32 and 33 parallel to the xy-plane of coordinate system 21 and parallel, relatively narrow top and bottom edge surfaces 34 and 35 parallel to the xz-plane. Light from images generated by a display engine such as a display engine 70 shown in FIG. 1 is coupled into waveguide 31 optionally by a prismatic input coupler 71 through an input aperture 36 located on an end surface 37 of the x-waveguide. Light entering x-waveguide 31 through input aperture 36 is repeatedly totally internally reflected (TIR) from face surfaces 32 and 33, also referred to as TIR surfaces 32 and 33, to bounce back and forth between the TIR surfaces and propagate along the positive x-direction in the x-waveguide to reach and be incident on facets 40.

By way of example a light ray input into x-waveguide 31 propagating in a midplane 38 of the x-waveguide parallel to the xz-plane and being totally internally reflected from TIR surfaces 32 and 33 to bounce back and forth between the TIR surfaces is schematically represented by arrows 23. Optionally, upon entry into x-waveguide 31 polarization of light in light ray 23 schematically indicated by a block arrow 25 is parallel to midplane 38, and since the midplane is a plane of incidence of the light ray with TIR surfaces 32 and 33 the light ray is p polarized with respect to the plane of incidence.

Facets 40 are optionally parallel to each other and perpendicular to TIR surfaces 32 and 33 and are tilted by a tilt angle $\beta_x$ relative to bottom edge surface 35 and the x-axis. A normal 41 to each facet 40 is rotated relative to the y-axis by the tilt angle $\beta_x$. Each facet 40 as described below reflects a portion of light propagating in x-waveguide 31 that is incident on the facet through bottom edge surface 35 and into waveguide 51. For example when light ray 23 is incident on a facet 40 the facet reflects a portion of the light in the light ray into y-waveguide 51. It is noted that whereas light ray 23 is p polarized with respect to TIR surfaces 32 and 33, with respect to facets 40 because the normals 41 of the facets do not lie in the midplane, the light ray comprises both p and s polarized light.

Waveguide 51, also referred to as y-waveguide 51, is also optionally a rectangular prism. The waveguide has relatively large parallel TIR face surfaces 52 and 53 parallel to the xy-plane and parallel, relatively narrow left and right edge surfaces 54 and 55 respectively that are parallel to the yz-plane. Light reflected by facets 40 in x-waveguide 31 into y-waveguide 51 is repeatedly TIR reflected from face surfaces 52 and 53 to bounce back and forth between the TIR surfaces and propagate in y-waveguide 51 along the y-axis to reach and be incident on facets 60 of the y-waveguide. Facets 60 are optionally parallel to each other and perpendicular to side surfaces 54 and 55. The facets are tilted by a tilt angle $\beta_y$ relative to TIR surface 52 and the y-axis. A normal 61 to each of facets 60 is rotated by tilt angle $\beta_y$ relative to the z-axis. Each facet 60 as described below reflects a portion of light propagating in y-waveguide 51 along the y-axis that is incident on the facet through an output aperture 57 on TIR face surface 53 to an EMB 80 for viewing by a user (not shown).

GOODIS 20 as shown in FIG. 1 has height h, width w, and thickness of depth d. X-waveguide 31 has height $h_1$ and y-waveguide 51 height $h_2$. Both waveguides optionally have a same width substantially equal to the width w of GOODIS and a same thickness or depth, d. Height h may be equal to $(h_1+h_2)$. By way of numerical example, in an embodiment h may have a value between about 30 mm (millimeters) and about 50 mm, height h between 30 mm and about 50 mm, and depth between about 1.0 mm to about 3 mm. Height $h_1$ of x-waveguide 31 in an embodiment may be between about 10 mm and about 20 mm, and height $h_2$ may be between about 10 mm and 40 mm. X-waveguide 31 may have between about 20 and about 30 facets 40 tilted at a tilt angle $\beta_x$ between about 25° and about 65°. Y-waveguide 51 may have between about 8 and about 12 facets 60 tilted at a tilt angle $\beta_y$ between about 20° and about 70°.

Figure 2:
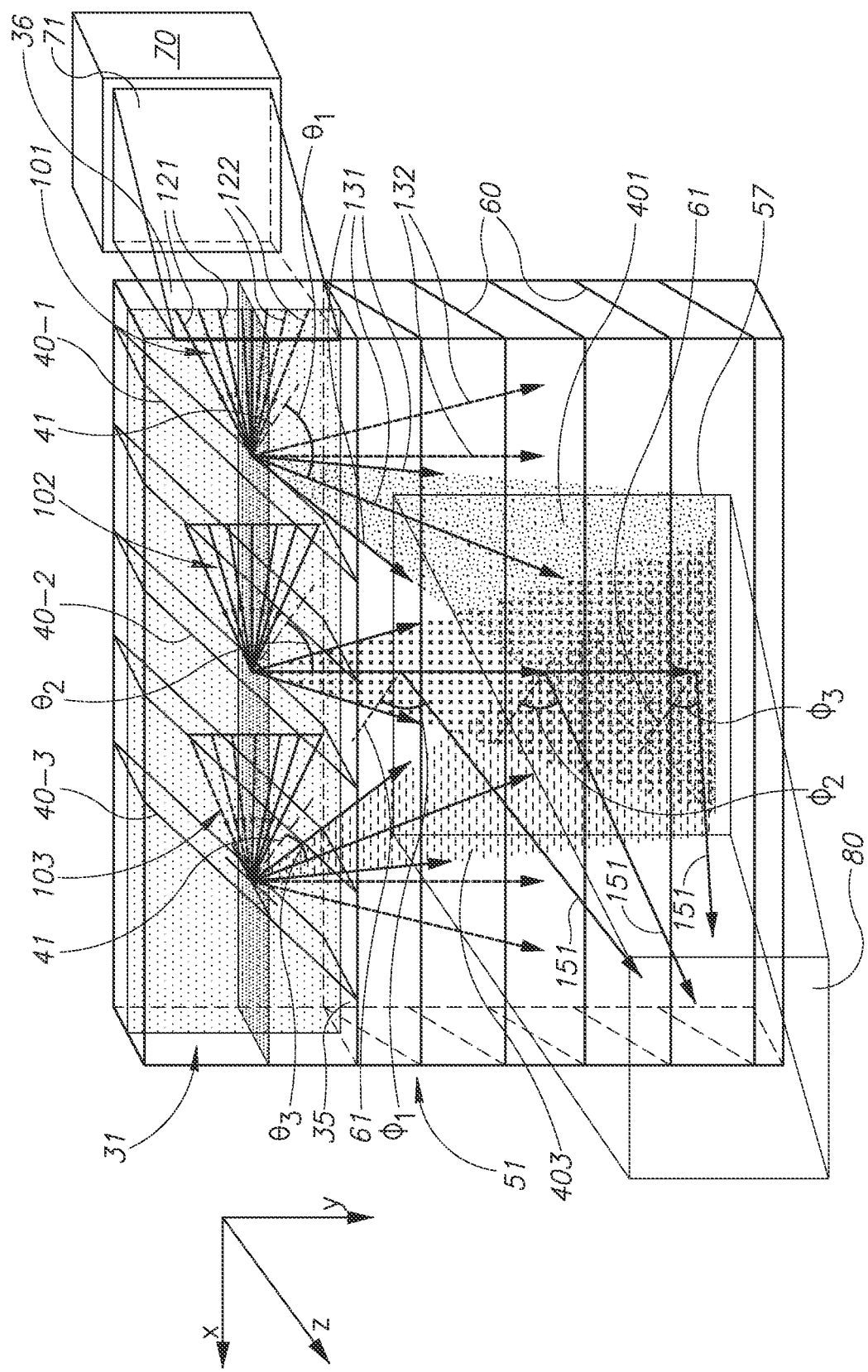
FIG. 2 schematically illustrates light propagation as a function of the geometry of the GOODIS shown in FIG. 1, in accordance with an embodiment of the disclosure.

FIG. 2 schematically illustrates propagation of light rays from virtual images generated by display engine 70 that are coupled into GOODIS 20 by input coupler 71 to travel along x-waveguide 31 and be reflected into y-waveguide 51 by facets 40 and thereafter by facets 60 in the y-waveguide toward EMB 80.

In x-waveguide 31 a triangular cluster of arrows converging to a point on a facet 40 from which the facet reflects light rays into y-waveguide 51 represents a cross section in the xy-plane of a FOV comprising angular directions along which light rays received from display engine 70 are incident on the facet. By way of example, three FOV xy cross sections represented by triangular clusters 101, 102, and 103 of angular propagation directions of light rays are shown in FIG. 2 for a selection of facets 40 individualized by labels 40-1, 40-2, and 40-3 respectively. A light ray in a FOV xy cross section 101, 102, and 103 represented by a solid arrow 121 is reflected into y-waveguide 51 along an angular direction represented by a solid arrow 131 for which facets 60 in the y-waveguide successfully reflect light into EMB 80. However, not all light from light rays in the FOV of the virtual image that are incident on a facet 40 and reflected into y-waveguide 51 are successfully reflected into EMB 80. A dashed arrow 122 in a FOV cross section 101, 102, or 103 represents a light ray that facet 40-1, 40-2 or 40-3 respectively reflects into y-waveguide 51 along an angular direction represented by a dashed arrow 132 for which facets 60 reflect light that misses EMB 80. Solid arrows 131 representing angular directions of light rays from which light is successfully reflected into EMB 80 by facets 60 are shown pointing into output aperture 57. Dashed arrows 132 representing angular directions of light rays from which facets 60 reflect light that fails to reach EMB 80 are shown pointing towards regions outside of output aperture 57.

Shaded areas 401, 402, and 403 in FIG. 2 schematically indicate ranges of angular directions along which facets 40-1, 40-2, and 40-3 respectively reflect light rays from which facets 60 successfully reflect light into EMB 80. Median angular directions in ranges 401, 402, and 403 along which the facets respectively reflect incident light rays are indicated by relatively long solid arrows 131 in the ranges. The median angular directions for ranges 401, 402, and 403 are directed along angles $\theta_1$, $\theta_2$, and $\theta_3$, relative to normals 41 of facets 40-1, 40-2 and 40-3 respectively. Angles $\theta_1$, $\theta_2$, $\theta_3$, are angles of incidence and reflection of light rays that are reflected along the median angular directions in ranges. As a result of the locations of facets 40-1, 40-2 and 40-3 relative to outlet aperture 57, and as schematically shown in FIG. 2, $\theta_1 > \theta_2 > \theta_3$. Quite generally, a median angular direction of incidence and corresponding angular direction of reflection along which a facet 40 reflects light rays and from which subsequently facets 60 successfully reflect light to EMB 80 decreases with distance of the facet from input aperture 36.

Similarly, median angular directions of light that facets 60 reflect into EMB 80 from light rays reflected into y-waveguide 51 by facets 40 decrease with distance of facets 60 from bottom surface 35 of x-waveguide 31. The median angular directions for a selection of facets 60 are represented by solid arrows 151. Angles of reflection between the median angular directions 151 and normals 61 for the selection of facets 60 are labeled $\varphi_1$, $\varphi_2$, and $\varphi_3$, where a larger subscript identifies an angle associated with a facet 60 further from bottom surface 35.

The above discussion indicates that different facets of GOODIS 20 reflect different angular portions of an input FOV of a virtual image from display engine 70 into EMB 80. And in general, to achieve a high fidelity output image, the farther a facet 40 in x-waveguide 31 is from input aperture 36 the larger should be reflectivity of the facet for light from portions of the input FOV having smaller angles of incidence, AOI, on the facet, which the facet reflects to larger values of x in the EMB. Similarly, the farther a facet 60 in y-waveguide 51 is from bottom edge surface 35 of x-waveguide 31, the larger should be reflectivity of the facet for light from portions of the input FOV having smaller AOIs on the facet, which the facet reflects to larger values of y in the EMB.

Let an "x" index such as k(x) designate a facet 40 in x-waveguide 31 and let the value of the index increase with distance of the designated facet 40 from input aperture 36. Similarly, let a "y" index, such as k(y) designate a facet 60 in y-waveguide 51 and let the value of the index increase with distance of the designated facet 60 from surface 35. The constraints for provision of a high fidelity output virtual image expressed by expressions (2) and (3) may be written to express constraints on facets 40, which may also be referred to as x-facets 40, $$[(|TP°_{k(x),m} - TP°_{j(x),n}|/AVG(TP°_{k(x),m}, TP°_{j(x),n})) < \delta\% | I(\alpha_m) = I(\alpha_n), \forall(j(x), k(x)), \forall(m,n)] \quad (3)$$

Similarly the constraints on facets 60, optionally referred to as y-facets 40, may be written $$[(|TP°_{k(y),m} - TP°_{j(y),n}|/AVG(TP°_{k(y),m}, TP°_{j(y),n})) < \delta\% | I(\alpha_m) = I(\alpha_n), \forall(j(y), k(y)), \forall(m,n)] \quad (4)$$

Constraints (3) and (4) are complex constraints that are typically relatively difficult to satisfy without having a different dedicated reflective coating for each x-facet 40 and each y-facet 60. In accordance with an embodiment GOODIS advantageously uses differences in reflectivity for p and s light to provide coatings on facets 40 and 60 to provide an advantageous fidelity for virtual images that GOODIS provides EMB 80. In an embodiment x-facets 40 of waveguide 31 are provided a same partially reflective coating that provides reflectivity for p and s light as a function of angle of incidence AOI shown by a graph 540 in FIG. 3A. In an embodiment y-facets 60 of waveguide 51 are provided a same coating that provides reflectivity for p and s light as a function of angle of incidence AOI shown by a graph 560 in FIG. 3B.

Facets 40 and 60 having AOI dependent partially reflective coatings that exhibit reflectivities shown in graphs 540 and 560 respectively may be manufactured using any of various materials and manufacturing processes. For example, the facets may be produced by depositing partially reflective coatings on surfaces of preformed prisms and bonding the prisms together. The prisms may be fabricated by grinding and polishing a silicate material, such as BK-7, to a desired shape, or by injection molding a suitable polymer or sol-gel. The coatings may be formed from any of various suitable materials such as by way of example, Hafnium dioxide ($HfO_2$), Magnesium fluoride ($MgF_2$) and/or Tantalum pentoxide ($Ta_2O_5$).

Figure 3A:
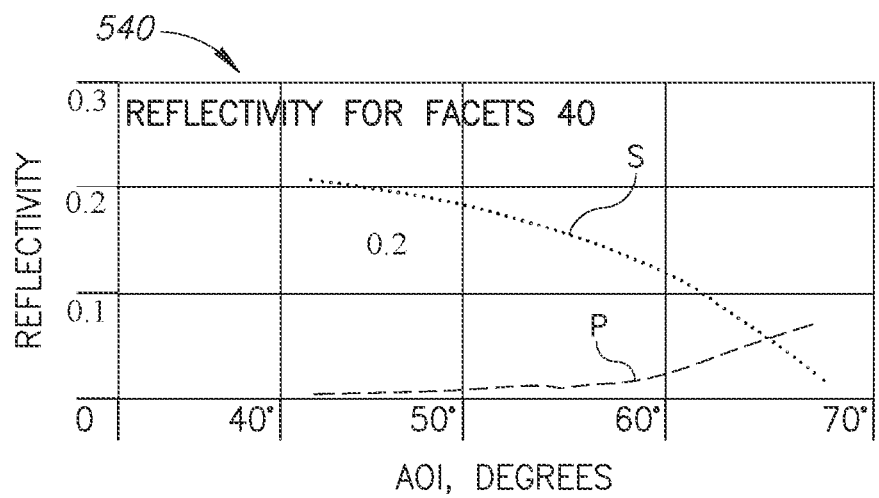
FIG. 3A shows schematic graphs of reflectivity of a dielectric coating as a function of angle of incidence for p and s light incident on facets of the GOODIS in the first LOE that contribute to providing an advantageous fidelity that characterizes the GOODIS, in accordance with an embodiment of the disclosure.
Figure 3B:
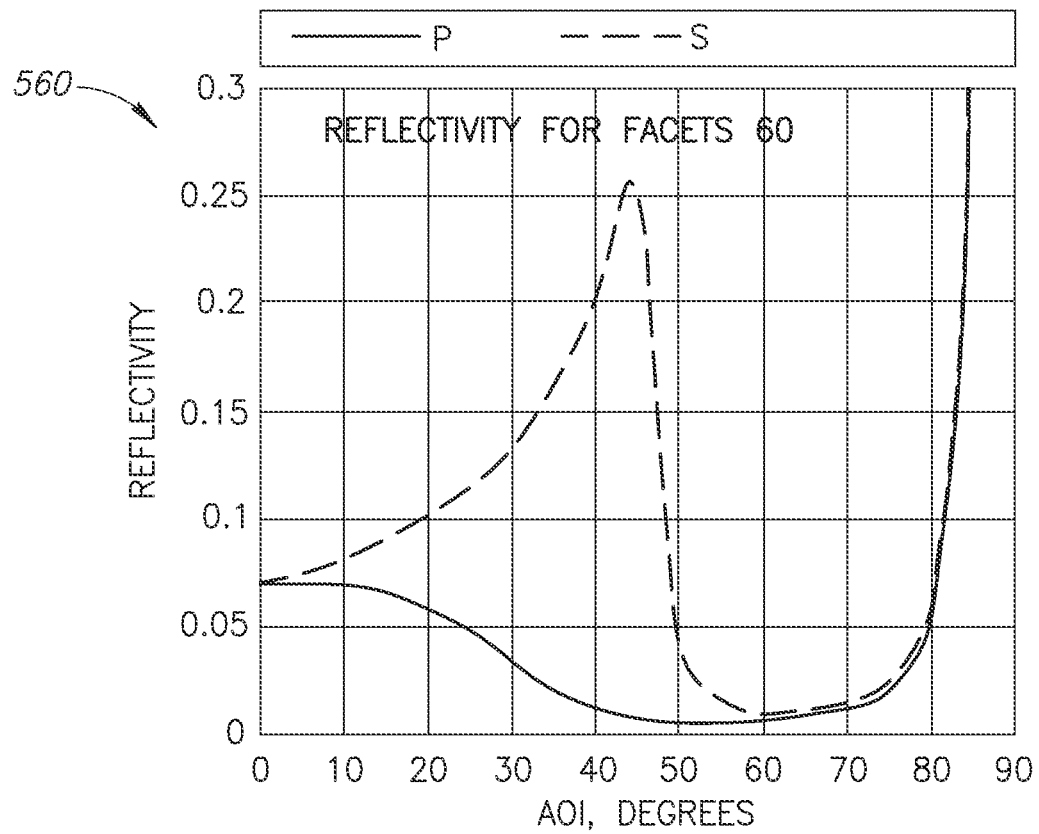
FIG. 3B shows schematic graphs of reflectivity of a dielectric coating as a function of angle of incidence for p and s light incident on the facets of the GOODIS in the second LOE that contribute to providing an advantageous fidelity that characterizes the GOODIS, in accordance with an embodiment of the disclosure.
Figure 3C:
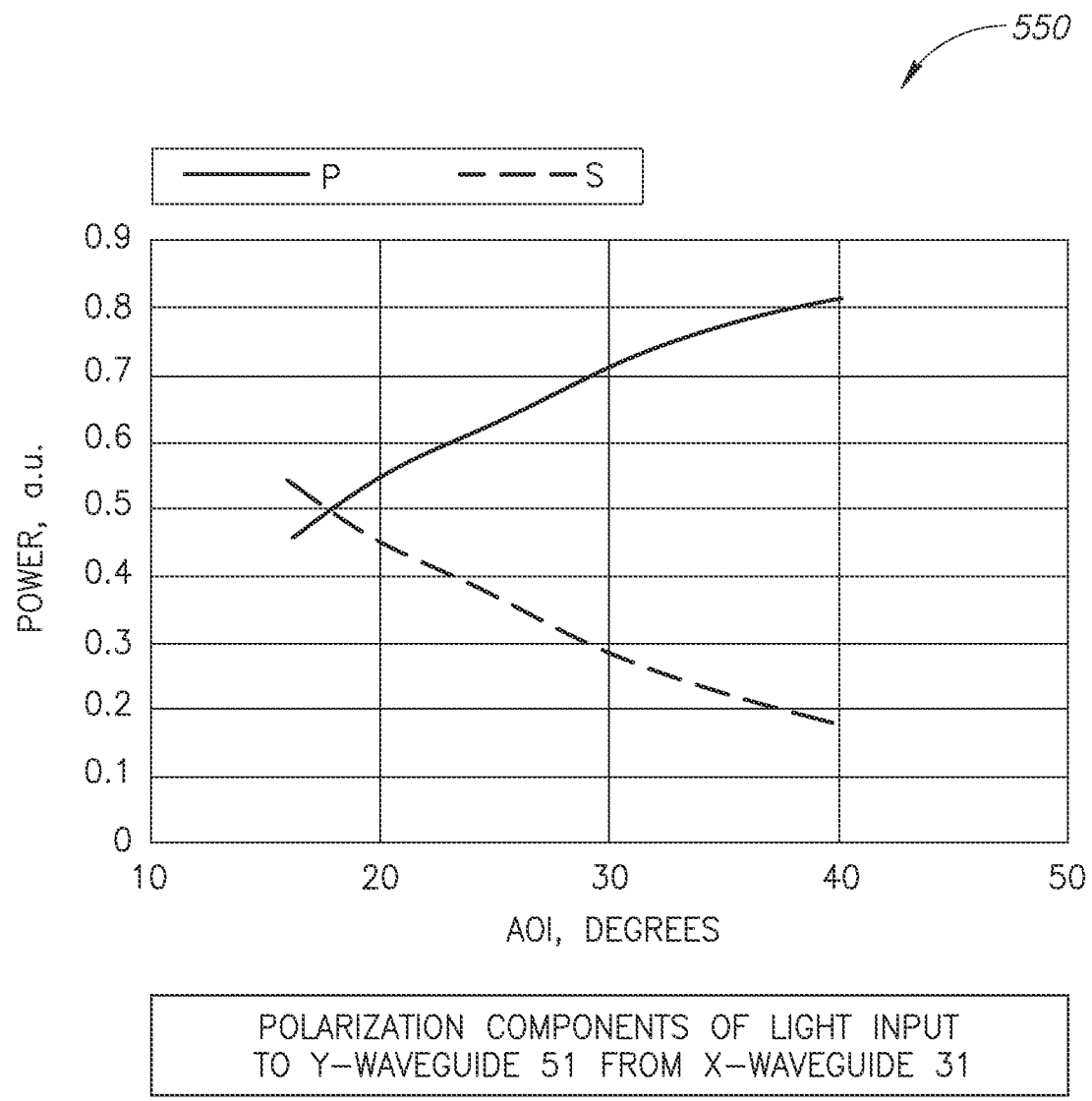
FIG. 3C shows a schematic graph of dependence of s and p polarization light reflected into the second LOE from the first LOE assuming that light from a virtual image input into the first LOE is substantially p polarized with respect to TIR surfaces of the first LOE, in accordance with an embodiment of the disclosure.

In an embodiment, display engine 70 and/or prismatic input coupler 71 are configured to provide virtual images to GOODIS 20 for which light from the virtual images are substantially p polarized with respect to planes of incidence of the light on TIR face surfaces 32 and 33 upon entry of the light into x-waveguide 31. For p polarized light in the input to x-waveguide 31 and reflectivity of facets 40 as shown in FIG. 3A, as a result of dependence of polarization of light reflected by facets 40 on angle of incidence of the light, dependence of polarization of light reflected by facets 40 into y-waveguide 51 on angles of incidence on facets 60 is substantially as shown by a graph 550 in FIG. 3C. sssssss Graph 550 shows that for the p-polarized light input into x-waveguide 31 and reflected by facets 40 having reflectivity shown in FIG. 3A light entering y-waveguide has a p component close to about 4 times greater than an s component at angles of incidence on y-waveguide facets of about 40 degrees. As shown by graph 3B reflectivity of facets 60 for p and s light respectively decreases and increases with angle of incidence. As a result the preponderance of p polarized light entering y-waveguide 51 and dependence of reflectivity of p and s light advantageously promotes homogeneity along the y-axis of intensity of light projected by facets 60 in a same given angular direction into EMB 80.

For example reflectivities given by graphs 540 and 560 and p polarized virtual images input into x-waveguide 31 in accordance with an embodiment of the disclosure, GOODIS 20 provides virtual images at EMB 80 that exhibit advantageous fidelity that is greater than about 70% along both the x and y directions. For 80% fidelity the output virtual images conserves relative brightness of a virtual input image provided by display engine 70 and prismatic input coupler to within about 30% and spatial uniformity in the EMB of intensity of light projected along a same angular direction into the EMB to within about 30%.

Figure 4:
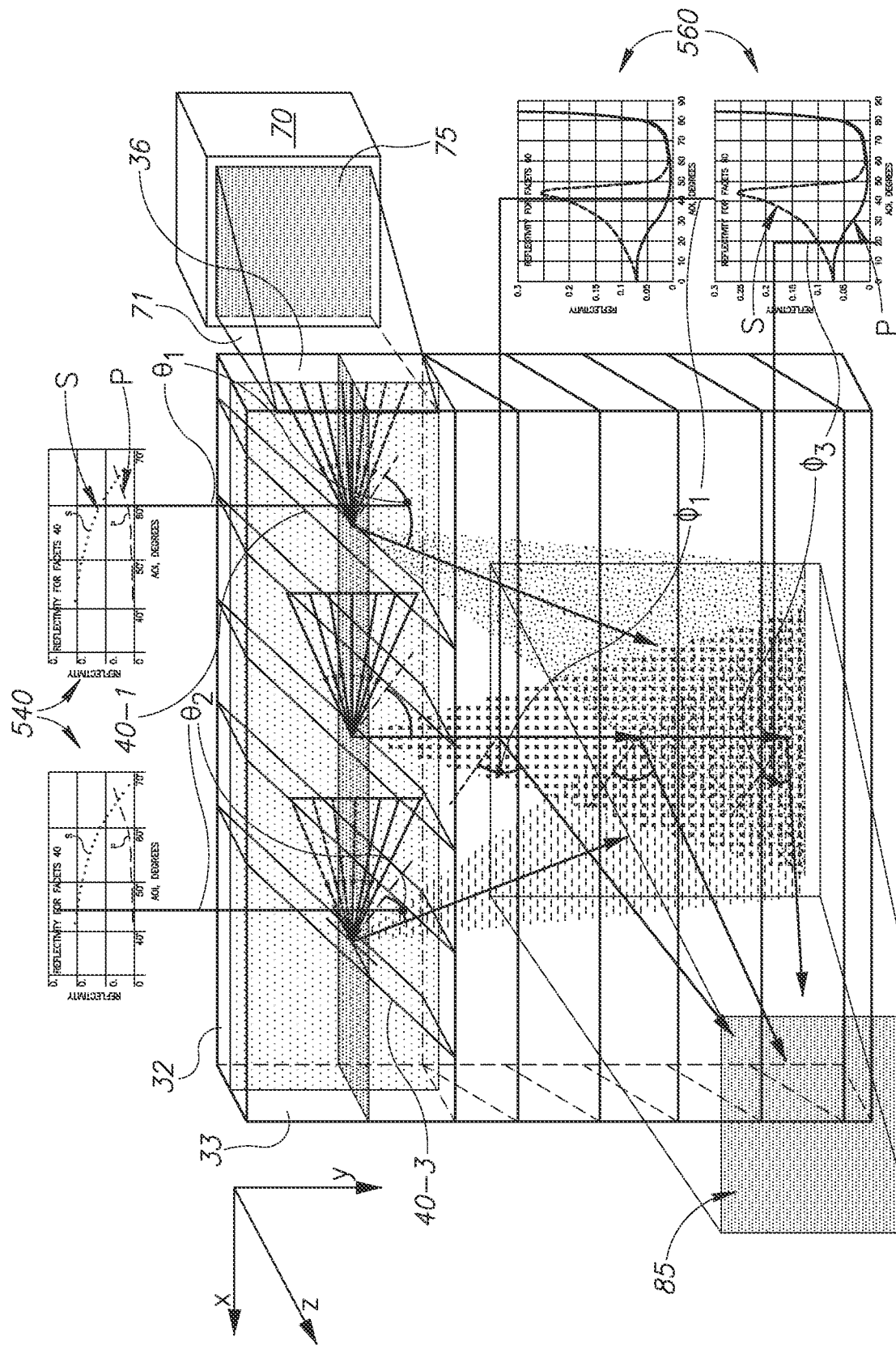
FIG. 4 schematically illustrates operation of a GOODIS having facets coated with the dielectric coatings shown in FIGS. 3A and 3B, in accordance with an embodiment of the disclosure.

FIG. 4 schematically illustrates operation of GOODIS 20 and facets 40 and 60 in providing an output virtual image 85 in EMB 80 characterized by an advantageous fidelity for an input virtual image 75 characterized by a substantially uniform brightness indicated by a uniform shading of the input virtual image. Values for reflectivity of p and s polarized light for x-facets 40-1 and 40-3 relevant to portions of input and output virtual images 75 and 85 that the facets reflect toward EMB 80 are indicated in copies of graphs 540 connected to median AOI angles $\theta_1$ and $\theta_3$. Values for reflectivity of p and s polarized light for facets 60 that are respectively closest to and farthest from surfaces 35 relevant to portions of input and output virtual images 75 and 85 that the facets reflect toward EMB 80 are indicated in copies of graphs 560 connected to median AOI angles $\phi_1$ and $\phi_3$. Whereas output virtual image 85 may not exhibit perfect fidelity, uniformity of shading of the output virtual image is intended to schematically indicate that the output virtual image evidences a fidelity of about 70% and preserves relative intensity and spatial uniformity to about 30% along both the x and y directions.

It is noted that whereas the above description references an embodiment of a GOODIS 20 that employs only two different reflective coatings, an embodiment of the disclosure is not limited to a same single partially reflective coating for x-facets 40 and a different same single partially reflective coating for y-facets 60. For example, a GOODIS 20 in accordance with an embodiment may have a different partially reflective p and s coating for each of two or more groups of facets 40. Similarly, a GOODIS 20 in accordance with an embodiment may have a different partially reflective p and s coating for each of two or more groups of facets 60.

In general, with increase in the number of partially reflective coatings having different respective p and s AOI dependencies, fidelity of virtual images provided by a GOODIS in accordance with an embodiment of the disclosure increases. It is also noted that whereas FIGS. 3C and 4 assume that light entering x-waveguide 31 is p polarized relative to TIR surfaces 32 and 33 (FIG. 1) practice of embodiments of the disclosure is not limited to p polarized input. Different relative intensities of p and s polarization light input to x-waveguide 31 may be coordinated with different reflectivities of facets 40 and 60 to provide advantageous fidelity output images provided by a GOODIS in accordance with an embodiment of the disclosure.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. An image delivery system (IDS) for a near eye display (NED), the IDS comprising:
a first waveguide comprising an input aperture for receiving an input virtual image provided by a display engine and a plurality of first facets positioned to reflect the input virtual image out of the first waveguide, the first facets having a reflectivity for s-polarized light that decreases substantially monotonically with an increase in an angle of incidence on the first facets between 40° and 76°; and
a second waveguide configured to receive the input virtual image from the first waveguide and comprising a plurality of second facets positioned to reflect the input virtual image out of the second waveguide as an output virtual image to an eye motion box (EMB),
wherein:
the facets comprise respective partially reflective coatings; and
the partially reflective coatings are configured to produce the output virtual image from the input virtual image with a fidelity of at least 80%.

2. The IDS according to claim 1, wherein:
a number of different partially reflective coatings within the IDS is less than a total number of the facets; and
the number of different partially reflective coatings is less than or equal to 20.

3. The IDS according to claim 2, wherein:
a number of different partially reflective coatings within the first waveguide is less than or equal to 15; and
a number of different partially reflective coatings within the second waveguide is less than or equal to 5.

4. The IDS according to claim 3, wherein the partially reflective coatings comprise a first partially reflective coating and a second partially reflective coating.

5. The IDS according to claim 4, wherein the first facets comprise the first partially reflective coating.

6. The IDS according to claim 5, wherein the second facets comprise the second partially reflective coating.

7. The IDS according to claim 1, wherein the first facets have a reflectivity for p-polarized light that increases substantially monotonically with an increase in the angle of incidence on the first facets between 40° and 76°.

8. The IDS according to claim 7, wherein, for angles of incidence on the first facets between 40° and 76°, s-reflectivity of the first facets is greater than p-reflectivity of the first facets.

9. The IDS according to claim 1, wherein the second facets have a reflectivity for s-polarized light that decreases substantially monotonically with a decrease in an angle of incidence on the second facets between 0° and 40°.

10. The IDS according to claim 9, wherein the second facets have a reflectivity for p-polarized light that increases substantially monotonically with a decrease in the angle of incidence on the second facets between 0° and 50°.

11. The IDS according to claim 10, wherein, for angles of incidence on the second facets between 0° and 50°, s-reflectivity of the second facets is greater than p-reflectivity of the second facets.

12. A system for providing a virtual image to an EMB, the system comprising:
an IDS according to claim 1; and
an apparatus configured to provide the IDS with the input virtual image.

13. The system according to claim 12, wherein the apparatus configures polarization of light in the input virtual image so that light from the input virtual image that is incident on the second facets has a component of p-polarized light that is greater than a component of s-polarized light.

14. The system according to claim 13, wherein an intensity of the p-polarized light is at least three times an intensity of the s-polarized light.

15. An image delivery system (IDS) for a near eye display (NED), the IDS comprising:
a first waveguide comprising an input aperture for receiving an input virtual image provided by a display engine and a plurality of first facets positioned to reflect the input virtual image out of the first waveguide, the first facets having a reflectivity for p-polarized light that increases substantially monotonically with an increase in an angle of incidence on the first facets between 40° and 76°; and
a second waveguide configured to receive the input virtual image from the first waveguide and comprising a plurality of second facets positioned to reflect the input virtual image out of the second waveguide as an output virtual image to an eye motion box (EMB).

* * * * *